United States Patent [19]
Uitti et al.

[11] 3,913,542

[45] Oct. 21, 1975

[54] SIMPLIFIED TURBO CHARGER SYSTEM FOR AIRCRAFT

[75] Inventors: Paul M. Uitti, Huntington Beach; William H. Mastin, Jr., Long Beach, both of Calif.

[73] Assignee: Rajay Industries, Inc., Long Beach, Calif.

[22] Filed: Sept. 16, 1974

[21] Appl. No.: 506,575

Related U.S. Application Data

[63] Continuation of Ser. No. 335,167, Feb. 23, 1973, abandoned.

[52] U.S. Cl. .............. 123/119 C; 60/598; 60/605; 60/611
[51] Int. Cl.² ............................................ F02B 33/44
[58] Field of Search ..................... 60/598, 605, 611; 123/119 C

[56] References Cited
UNITED STATES PATENTS

| | | | |
|---|---|---|---|
| 2,622,390 | 12/1952 | Newton | 60/13 |
| 2,849,992 | 9/1958 | Stillebroer et al. | 60/605 X |
| 3,186,161 | 6/1965 | Bricout | 60/13 |
| 3,208,213 | 9/1965 | Anderson | 60/13 |
| 3,233,403 | 2/1966 | MacIness et al. | 60/13 |
| 3,324,651 | 6/1967 | Smith et al. | 60/13 |
| 3,421,314 | 1/1969 | Michalke | 60/13 |
| 3,435,813 | 4/1969 | Wagner | 60/13 |
| 3,464,202 | 9/1969 | Wagner | 60/13 |
| 3,541,784 | 11/1970 | Haase | 60/13 |
| 3,548,798 | 12/1970 | Fleischer | 60/13 |
| 3,651,636 | 3/1972 | Glassey et al. | 60/13 |

Primary Examiner—Charles J. Myhre
Assistant Examiner—Daniel J. O'Connor
Attorney, Agent, or Firm—Cox, Smith, Smith, Hale & Guenther Incorporated

[57] ABSTRACT

An aircraft engine receives its fuel/air mixture directly from a turbocharger whose turbine and centrifugal compressor are directly coupled. The turbine is driven directly by the full flow of exhaust gases without intervening controls and modulation. Regulation of the system, such as to prevent overboost, is effected substantially entirely by an intake throttle to the turbocompressor in both carburetted and fuel-injected versions.

4 Claims, 1 Drawing Figure

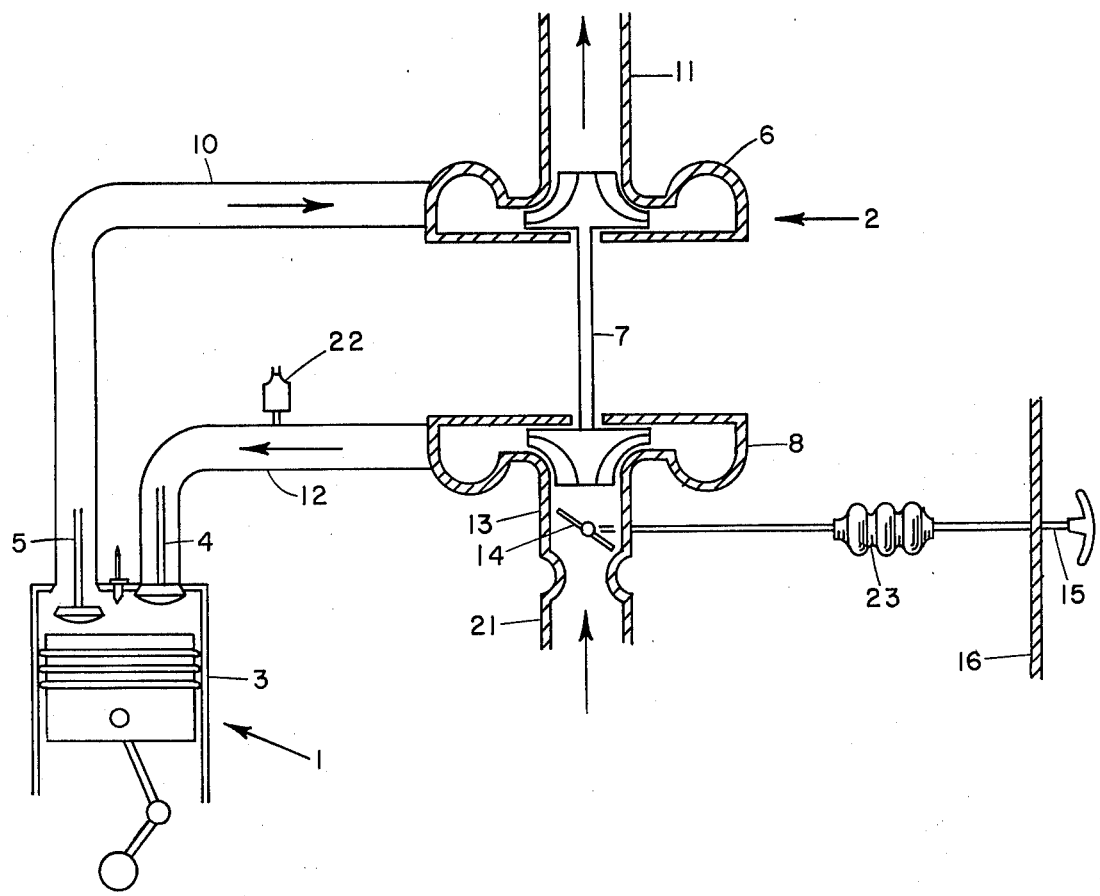

SIMPLIFIED TURBO CHARGER SYSTEM FOR AIRCRAFT

This is a continuation of U.S. Patent Application Ser. No. 335,167 filed on Feb. 23, 1973, the patent application having been expressly abandoned simultaneous with the filing of the present application.

BACKGROUND OF THE INVENTION

The present invention relates to the supercharging of engines, and is more particularly concerned with the simplified turbocharging of aircraft engines to escape the present trend toward increasingly complex and delicate boost-controls. The primary purpose of an aircraft turbocharger system is to enable the aircraft engine to maintain its normally aspirated sea level power at altitude by supplying the added amount of air for combustion. It is not the intent of this invention to provide a turbocharger system for aircraft with the turbocharger engine at sea level capable of performing at full throttle under conditions of turbocharger boosts. Neither the engine nor the turbocharger are matched with the proper turbocharger size, carburetor, ignition timing or other variable to provide acceptable full throttle performance at sea level.

BRIEF DESCRIPTION OF PRIOR ART

A wide variety of supercharger controls and, particularly, altitude-compensating boost controls have been developed and tried — some of them with significant success.

However, these have been based on the concept of primary, secondary and sometimes tertiary or further control norms and — to their further complication and excessive weight — a variety of overrides, interlocks and "refinements."

In the carburetted versions of prior systems the carburetor is located in its original position on the engine and the turbocharger compressor draws ambient air in, compresses it and passes it into the pressurized carburetor and on into the engine at a pressure higher than the ambient pressure of the outside air. The engine exhaust gases, which drive the turbocharger, are by-passed around the turbine through a wastegate, to allow only enough gas to enter the turbine to produce the desired compressor discharge and resultant manifold pressure. This system of reduced by-passing occurs generally after wide open throttle no longer provides the desired manifold pressure, and is actuated by a system of manual and/or automatic controls and sensors. Similarly, in fuel injection versions of prior systems the air throttle body is substituted for the carburetor and the turbocharger compressor draws ambient air in and passes it into the pressurized air throttle body and on into the engine, with manifold pressure controlled by the wastegate.

Such complicated systems have their place in expensive, piston powered, high performance aircraft.

However, these prior systems are too expensive, complex, sensitive and heavy to be considered for lighter aircraft in the single or twin-engine category of the type usually considered to be "general aviation" units.

SUMMARY OF THE INVENTION

In general, the preferred form of the present invention comprises an internal-combustion, aircraft engine having a turbocharger installation mismatched to the aircraft engine at sea level and including an exhaust-driven turbine with an undersized nozzle coupled to a centrifugal compressor. The entire exhaust flow is confined to discharge only through the turbine.

Relocation of the carburetor or air throttle body is essential to the operation of the system. When no wastegate is used, throttling of the induction air, which also limits the amount of exhaust gases driving the turbine, must be done at the inlet to the compressor. Throttling at the compressor discharge could result in compressor surging and unstable operation.

Conventional modulating fuel supply means are provided to supply fuel to the charge being introduced into the engine.

In the carburetted version of the present invention, the carburetor is located at the compressor inlet and the fuel/air mixture is passed, under pressure, directly to the intake manifold. The desired manifold pressure is controlled entirely by the carburetor throttle position and no wastegate or related controls are required. A simple non-pressurized carburetor may be used, eliminating throttle shaft seals and pressurized float chamber. Also, the standard fuel pump or gravity fuel supply can be used, rather than the high pressure pump which senses compressor discharge pressure in the pressurized carburetor configuration.

In the fuel injection version of the present invention, the air throttle is located at the compressor inlet in the same manner as the carburetor with the compressor discharge air going directly to the engine intake manifold. The desired manifold pressure is controlled entirely by the air throttle position and no wastegate or related controls are required.

In either version of the present invention, an evacuated bellows type of pneumatic override in the throttle linkage can be incorporated to sense overboost and serve to close the throttle. For overall safety against overboost, a simple absolute pressure relief valve can be provided in the intake manifold. This eliminates the costly, more complex and less reliable control systems.

In larger engines employing two turbochargers, a single carburetor or air throttle body can be used, with an equalizer tube incorporated to balance air or mixture distribution to both turbochargers. Similarly, a separate carburetor or air throttle could be used on each turbocharger, with an equalizer tube between the turbochargers in the compressor discharge.

The system of this invention results in lower exhaust back pressures under certain lower altitude conditions than current systems with automatic controls sensing a single compressor discharge pressure which is throttled down to the desired manifold pressure. A lower intake manifold temperature also would exist. Both features would improve fuel economy and prolong engine life.

The aircraft engine and the turbocharger are unmatched at sea level and are sized to substantially overboost with full throttle at sea level.

BRIEF DESCRIPTION OF THE DRAWING

A better understanding of the invention may be derived from the following description and the accompanying FIGURE which is a schematic view of a turbocharged engine embodying the carburetted version of the system of this invention.

DESCRIPTION OF THE PREFERRED EMBODIMENT

As shown in the drawing, the preferred form of the present invention comprises an aircraft engine 1 supplied by a turbocharger 2. The engine includes a plurality of cylinders 3 (only one of which is depicted, for simplicity) each having a valved intake 4 and a valved exhaust 5.

The turbocharger 2 includes an exhaust-driven turbine 6 directly coupled, as by a shaft 7 to a centrifugal compressor 8. The turbine has an undersized nozzle which results in a substantial engine overboost with full throttle at sea level thus enabling the engine to operate at full engine power at sea level with the throttle only partially open. The turbocharger is sized and designed to compensate for loss of manifold pressure due to increased altitude and to produce full engine power at the critical altitude with full throttle.

Exhaust-confining means such as an exhaust manifold here represented as an exhaust pipe 10 provide closed communication between the engine exhaust 5 and the intake of the turbine 6. It is important to the present invention that the turbine receive the undivided, full flow of engine exhaust throughout its normal operating range, as will be discussed more fully hereinafter. The turbine discharges through a conventional tail pipe 11.

The centrifugal compressor 8 delivers its charge to the engine intake 4 via an intake manifold here represented as an intake pipe 12. The intake of the compressor is connected to a carburetor 21 and is in communication with the atmosphere through the carburetor 21. The carburetor throttle valve 14 is manually controlled by a throttle lever 15 on the pilot's panel 16. In a relatively "closed" position, the throttle valve 14 "starves" or unloads the compressor 8 while relatively "open" positions of the throttle 14 operate to "feed" or load the compressor. The fuel/air mixture is supplied from the carburetor in a conventional manner and passes through the compressor into the intake manifold 12.

If desired, safety reliefs may be incorporated in the system. For example, an excess-pressure or overpressure sensing means 22 may be associated with the intake manifold or intake pipe 12. As may be desired, the overpressure means 22 may be a direct vent to atmosphere or, alternatively, it may be associated with an override servo 23 to override the manual throttle lever 15.

However, it is to be understood that such supplemental controls are of far less significance or criticality in the present invention than they would be in other systems. This obtains, in particular, from the fact that the present invention has both recognized and utilized a feature inherent in turbochargers.

Accordingly, it is most significant, in the present invention, that turbines and centrifugal compressors have inherent "slip" losses not found in positive-displacement supercharging compressors — or, for that matter, in geardriven centrifugal-compressor boosting systems.

It is significant, therefore, that our system, in "starving" or "unloading" its compressor, accordingly limits the gross delivery through the engine to the turbine, so that there is a lesser tendency of the turbine to overdrive the compressor. Stated alternatively, the throttle valve not only controls the gross capacity of the compressor, but similarly limits the compressor, as well.

While the system of this invention has been described with reference to a conventional carburetor type of fuel-supply system it is to be understood that the other types of fuel-supply systems may be employed so long as the turbine receives the undivided full flow of engine exhaust throughout its normal operating range and the compressor is controlled on the intake side. For example, if a conventional fuel injection system were employed, it would only be necessary to locate the air throttle body of the fuel injection system on the compressor intake in lieu of the carburetor 21 and the turbocharger system will operate in the manner previously described.

OPERATION OF THE PREFERRED EMBODIMENT

Operation of the system of this invention is quite unlike a standard system. The principal difference is that maximum power is selected by the pilot advancing the throttle lever to a specified manifold pressure, preselected for the particular installation, rather than advancing it to a maximum position.

As the aircraft climbs and manifold pressure drops with increasing altitude, the pilot merely advances the throttle lever thereby delivering more air to the compressor to maintain a predetermined manifold pressure and thereby a corresponding climb power setting.

Similar procedures are used for cruise and letdown power.

The maximum altitude reached before significant power loss starts occurring, (sometimes referred to as critical altitude), is that altitude where the throttle has been advanced to a maximum or wide open position to maintain sea level takeoff power. Continued climbing beyond this point will result in drop off of manifold pressure and corresponding power. The altitude where this occurs can be varied by the selection of turbocharger turbine components for the initial installation for sea level power.

We claim:
1. A method of operating a turbocharged aircraft engine at all altitudes comprising the steps of;
   a. mismatching a turbocharger to an aircraft engine so that said turbocharger can overpressurize an inlet manifold of said aircraft engine at lower altitudes;
   b. discharging all of the exhaust gases from said aircraft engine through a turbine of said turbocharger; and
   c. throttling an inlet of a directly coupled centrifugal compressor of said turbocharger, said throttling controlling gross delivery to said inlet manifold of said aircraft engine to thereby maintain a preselected manifold pressure for maximum efficiency of operation, said throttling being toward the closed position at lower altitudes and toward the open position at higher altitudes.
2. The method of operating a turbocharged aircraft engine at all altitudes as recited in claim 1, further including the step of overriding said throttling to prevent overpressurization in said inlet manifold at lower altitudes in case of failure.
3. The method of operating a turbocharged aircraft engine at all altitudes as recited in claim 2, wherein said overriding consists of venting excessive pressure in said inlet manifold to atmosphere.
4. The method of operating a turbocharged aircraft engine at all altitudes as recited in claim 2, wherein said overriding consists of an override servo counteracting a lever for pilot operation.

* * * * *